US012369079B2

(12) United States Patent
Xu et al.

(10) Patent No.: US 12,369,079 B2
(45) Date of Patent: Jul. 22, 2025

(54) METHOD TO PRIORITIZE 5G NSA CELL (RE) SELECTION, AND COMPUTER SYSTEM

(71) Applicant: GUANGDONG OPPO MOBILE TELECOMMUNICATIONS CORP., LTD., Guangdong (CN)

(72) Inventors: Xin Xu, Palo Alto, CA (US); Yongsheng Shi, Palo Alto, CA (US); Jun Niu, Palo Alto, CA (US)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 513 days.

(21) Appl. No.: 17/841,269

(22) Filed: Jun. 15, 2022

(65) Prior Publication Data

US 2022/0312285 A1 Sep. 29, 2022

Related U.S. Application Data

(63) Continuation of application No. PCT/CN2020/128793, filed on Nov. 13, 2020.
(Continued)

(51) Int. Cl.
*H04W 36/00* (2009.01)
*H04W 48/18* (2009.01)

(52) U.S. Cl.
CPC ....... *H04W 36/0061* (2013.01); *H04W 48/18* (2013.01)

(58) Field of Classification Search
None
See application file for complete search history.

(56) References Cited

U.S. PATENT DOCUMENTS

2015/0004966 A1* 1/2015 Ayleni ............... H04W 48/16
455/433
2015/0146627 A1* 5/2015 Ananda ............. H04W 48/16
370/329
(Continued)

FOREIGN PATENT DOCUMENTS

CN 106171013 A 11/2016
CN 108024299 A 5/2018
(Continued)

OTHER PUBLICATIONS

Chinese First Office Action with English Translation for CN Application 202080085778.0 mailed Apr. 29, 2023. (09 pages).
(Continued)

*Primary Examiner* — Saad Khawar
(74) *Attorney, Agent, or Firm* — Young Basile Hanlon & MacFarlane, P.C.

(57) ABSTRACT

During the transition period from 4G and long-term evolution (LTE) to 5G technology, for 5G capable user equipment (UE), it is preferred to utilize non-standalone (NSA) cells that support 5G technology rather than LTE only cells. To enable such preference, a fingerprint database recording known neighboring NSA cells to LTE only cells and a flag for identifying NSA cells in the acquisition database of the UE can be used to prioritize searching for NSA cells on startup and to expedite reselection to an NSA cell when camping on LTE only cells. To avoid excess battery drain when camping on LTE only cells since searching for cells consumes significant power of the UE, a series of timers and a counter can be used to disable the NSA preferred feature if an NSA cell is not found after a reasonable search while camping on the LTE only cell.

6 Claims, 10 Drawing Sheets

Related U.S. Application Data

(60) Provisional application No. 62/949,000, filed on Dec. 17, 2019.

(56) References Cited

U.S. PATENT DOCUMENTS

| | | | |
|---|---|---|---|
| 2019/0069205 A1 | 2/2019 | Lee et al. | |
| 2020/0077325 A1* | 3/2020 | Jangid | H04W 48/20 |
| 2021/0007025 A1* | 1/2021 | Kumar | H04W 36/008357 |
| 2022/0182904 A1* | 6/2022 | Li | H04W 48/08 |

FOREIGN PATENT DOCUMENTS

| | | |
|---|---|---|
| WO | 2011152999 A1 | 12/2011 |
| WO | 2015038236 A1 | 3/2015 |

OTHER PUBLICATIONS

Communication pursuant to Rule 164(1) EPC for EP Application 20902671.5 mailed May 12, 2023. (18 pages).
Extended European Search Report for EP Application 20902671.5 mailed Aug. 14, 2023. (17 pages).
Chinese Notification to grant Patent Right for Invention with English Translation for CN Application 202080085778.0 X mailed Aug. 31, 2023. (3 pages).
International Search Report for PCT Application PCT/CN2020/128793 mailed Feb. 18, 2021. (9 pages).
Ericsson, Handling RAT priorities in low frequency NR deployment scenarios, 3GPP TSG-RAN2 Meeting #104, R2-1817124, Nov. 12-16, 2018. (4 pages).

\* cited by examiner

| Number | PLMN | Frequency | Cell ID |
|---|---|---|---|
| 1 | 123-45 | 1215 | 0 |
| 2 | 123-46 | 2256 | 3 |
| 3 | 123-45 | 1215 | 8 |

205

| Number | PLMN | Frequency | Cell ID | NSA Cell |
|---|---|---|---|---|
| 1 | 123-45 | 1215 | 0 | TRUE |
| 2 | 123-46 | 2256 | 3 | FALSE |
| 3 | 123-45 | 1215 | 8 | FALSE |
| 4 | 123-45 | 1218 | 2 | TRUE |
| 5 | 123-45 | 1332 | 7 | TRUE |

| LTE Only Cell | | Discovered Neighbor NSA Cell | |
|---|---|---|---|
| Frequency | Cell ID | Frequency | Cell ID |
| F1 | C1 | F1 | C3 |
| | | F2 | C4 |
| F3 | C2 | F4 | C5 |

METHOD TO PRIORITIZE 5G NSA CELL (RE) SELECTION, AND COMPUTER SYSTEM

CROSS-REFERENCE TO RELATED APPLICATION(S)

The present application is a continuation-application of International (PCT) Patent Application No. PCT/CN2020/128793, filed on Nov. 13, 2020, which claims priority of U.S. Provisional Application No. 62/949,000, filed on Dec. 17, 2019, the entire contents of both of which are hereby incorporated by reference in its entirety.

TECHNICAL FIELD

Aspects of the disclosure relate to communications telephony and more particularly to a method to prioritize 5G non-standalone (NSA) cell (re) selection, and a computer system.

BACKGROUND

Changing technology in wireless communication is leading to a change from 4th Generation (4G) and Long-term evolution (LTE) technology to 5th Generation (5G) technology. The current infrastructure (e.g., cellular towers) support LTE communication. As the change to 5G technology arrives, the infrastructure is slowly changing to a hybrid LTE/5G stage. During this hybrid stage, LTE only cells (legacy LTE cells that do not support 5G) remain, and NSA cells (LTE cells which have a 5G neighbor cell) are also available for supporting communication on the network. During this transition period LTE only and NSA cells, there is currently no preference for 5G capable user equipment (UE) to use NSA cells rather than LTE only cells. Accordingly, the 5G capable UE may not take advantage of the faster speed available with 5G communication.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method of preferably accessing non-standalone (NSA) cells during startup of user equipment (UE). In such methods, the UE may search an acquisition database for an entry marked with an NSA flag indicating the associated entry is for an NSA cell. If an NSA cell that meets cell selection criteria is found in the acquisition database, the UE camps on the NSA cell. If no NSA cell is found in the acquisition database or it does not meet the cell selection criteria, the UE searches the acquisition database for other entries marked with a false value for the NSA flag indicating the associated entry is for a long-term evolution (LTE) only cell. The UE may camp on the LTE only cell if the LTE only cell is found in the acquisition database and meets the cell selection criteria. If no LTE only cell is found in the acquisition database or the LTE only cell does not meet the cell selection criteria, the UE may execute a band scan. The UE may camp on the NSA cell to avoid repeated reselection to multiple LTE only cells in short succession. Other embodiments of this aspect include corresponding computer systems, apparatus, and computer programs recorded on one or more computer storage devices, each configured to perform the actions of the methods.

Implementations of the above method may include one or more of the following features. In at least one implementation, the acquisition database has a number of entries reserved for NSA cells. In at least one implementation, the band scan includes scanning frequencies for a cell that meets the cell selection criteria without scanning frequencies scanned from the acquisition database a second time. In at least one implementation, the UE may update a fingerprint database with the frequency and cell identifier of the NSA cell the UE camps on. Implementations of the described techniques may include hardware, a method or process, or computer software on a computer-accessible medium.

Another general aspect includes a method for a user equipment (UE) to identify a non-standalone (NSA) cell while camping on a long-term evolution (LTE) only cell. In such methods, the UE may search a fingerprint database for a discovered neighbor NSA cell associated with the LTE only cell. If the UE finds an NSA cell listed as a discovered neighbor NSA cell in the fingerprint database, the UE may measure the frequency associated with the discovered neighbor NSA cell for reselection. If the UE does not find a discovered neighbor NSA cell in the fingerprint database or the discovered neighbor NSA cell does not meet the reselection criteria, the UE may execute an NSA background search. Other embodiments of this aspect include corresponding computer systems, apparatus, and computer programs recorded on one or more computer storage devices, each configured to perform the actions of the methods.

Implementations of the above method may include one or more of the following features. In at least one implementation, the UE may execute a first timer. In at least one implementation, the NSA background search includes, upon expiration of the first timer, the UE searches an acquisition database for an NSA cell that meets the reselection criteria. If the UE finds an NSA cell in the acquisition database, the UE measures the frequency associated with the NSA cell for reselection. If the UE does not find an NSA cell in the acquisition database or the NSA cell does not meet the reselection criteria, the UE searches the neighbor NSA cell frequency list for a neighbor NSA cell that meets the reselection criteria. If the UE finds a neighbor NSA cell in the neighbor NSA cell frequency list, the UE measures the frequency associated with the neighbor NSA cell for reselection. If the UE does not find a neighbor NSA cell or the neighbor NSA cell does not meet the reselection criteria, the UE may execute a band scan. In at least one implementation, the UE may increment a counter if no NSA cell that meets the reselection criteria was identified during the NSA background search. The UE may execute a second timer if the counter is less than a threshold value. Upon expiration of the second timer, the UE may re-execute the NSA background search.

In at least one implementation, the band scan includes searching for a derived NSA cell from the acquisition database. If the UE is able to derive an NSA cell from the acquisition database, the UE may measure the frequency associated with the derived NSA cell for reselection. If the UE cannot derive an NSA cell from the acquisition database or the NSA cell does not meet the reselection criteria, the UE may search a priority band list for a priority NSA cell. If the UE finds a priority NSA cell in the priority band list, the UE measures the frequency associated with the priority NSA cell for reselection. If the UE does not find a priority NSA cell in the priority band list or the priority NSA cell does not meet the reselection criteria, the UE may scan all remaining frequency bands to find an NSA cell suitable for camping on. At any time an NSA cell is identified that meets the reselection criteria, the UE may camp on the NSA cell and stop searching. In at least one implementation, in response to determining the UE is camped on an LTE only cell, the UE may temporarily increase all NSA cell reselection priority, rank all NSA cells based on signal quality or signal strength, and select the highest ranking NSA cell. The UE may evaluate the highest ranking NSA cell using the reselection criteria to expedite reselecting an NSA cell over remaining on the LTE only cell. In at least one implementation, in response to determining the UE is camped on an NSA cell, the UE may temporarily increase a high priority threshold for a high priority LTE only neighbor cell and temporarily increase an offset for intra frequency/equal priority inter frequency for neighbor LTE only cells to keep the UE from reselecting to a LTE only cell over the NSA cell it is camped on. Implementations of the described techniques may include hardware, a method or process, or computer software on a computer-accessible medium.

Yet another general aspect includes one or more processors; one or more memories storing computer-readable instructions that, upon execution by the one or more processors, configure the computer system to: search an acquisition database for an entry marked with a first value for a non-standalone (NSA) flag indicating the associated entry is for an NSA cell; camp on the NSA cell associated with the entry based upon a determination that the NSA cell meets a cell selection criteria; search the acquisition database for a second entry marked with a second value for the NSA flag indicating the associated entry is for a long-term evolution (LTE) only cell based upon a determination that the NSA cell does not meet the cell selection criteria; camp on the LTE only cell associated with the second entry based upon a determination that the LTE only cell meets the cell selection criteria; execute a band scan based upon a determination that the LTE only cell does not meet the cell selection criteria.

In at least one implementation, the acquisition database has a number of entries reserved for a plurality of NSA cells.

In at least one implementation, the band scan comprises scanning a plurality of frequencies for a cell that meets the cell selection criteria.

In at least one implementation, frequencies scanned from the acquisition database are not scanned again.

In at least one implementation, the computer-readable instructions that, upon execution by the one or more processors, are operable with the computer system to: in response to camping on the NSA cell associated with the entry, update a fingerprint database with a frequency and cell identifier of the NSA cell and any neighboring LTE only cells.

In at least one implementation, the acquisition database comprises, for each entry, a cell identifier, a frequency, and a value for the NSA flag.

In at least one implementation, the computer-readable instructions, upon execution by the one or more processors, are operable with the computer system to further stops searching and configures settings to remain camped on the NSA cell after be camped on the NSA cell.

BRIEF DESCRIPTION OF DRAWINGS

Various embodiments in accordance with the present disclosure will be described with reference to the drawings in which:

FIG. 2 illustrates example acquisition databases, according to some embodiments.

FIG. 3 illustrates an example fingerprint database, according to some embodiments.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, preferably selecting an NSA cell over an LTE only cell upon startup of the UE. During the transition period between LTE and 5G technologies, legacy cells that are LTE only cells (i.e., does not support 5G) may remain and NSA cells (i.e., LTE cells with a 5G neighbor cell) are included in the communication network. NSA cells allow the network to add the UE to the neighboring 5G cell to use the 5G service. Therefore, for 5G capable UEs, it is preferable for the UE to select an NSA cell as the serving cell (i.e., to camp on). The UE can prioritize the scan for a serving cell to scan for NSA cells first, if known, by searching an acquisition database containing previous serving cells of the UE for cells that are marked as NSA cells. To expedite finding service on startup, if no NSA cells are found in the acquisition database that are suitable, the UE can find an LTE only cell in the acquisition database to camp on.

Additionally, embodiments are directed to expediting reselection of a serving cell for a UE that is camped on an LTE only cell to search for an available NSA cell. Otherwise, 5G capable UEs may be stuck on LTE only cells, unable to utilize the faster 5G service. The UE may utilize timers and a counter to periodically search for an NSA cell efficiently to avoid battery drain since searching for cells is a power consuming activity of the UE. The UE searches for a suitable NSA cell starting with known potential NSA cell frequencies based on the serving LTE only cell. If an NSA cell is found, the UE will use the reselection process to reselect to the NSA cell as the serving cell. If no suitable NSA cell is located, the search is repeated after a period of time. To avoid excessive batter drain, the process of searching for an NSA cell is stopped after the search is executed a number of times, checked using a counter each time the search is executed.

Additionally, once the UE is camped on an NSA cell, the searching process is discouraged by setting threshold values that encourage the UE to remain on the NSA serving cell. Otherwise, the UE may jump to an LTE only cell because the connection is stronger.

Figure 1:
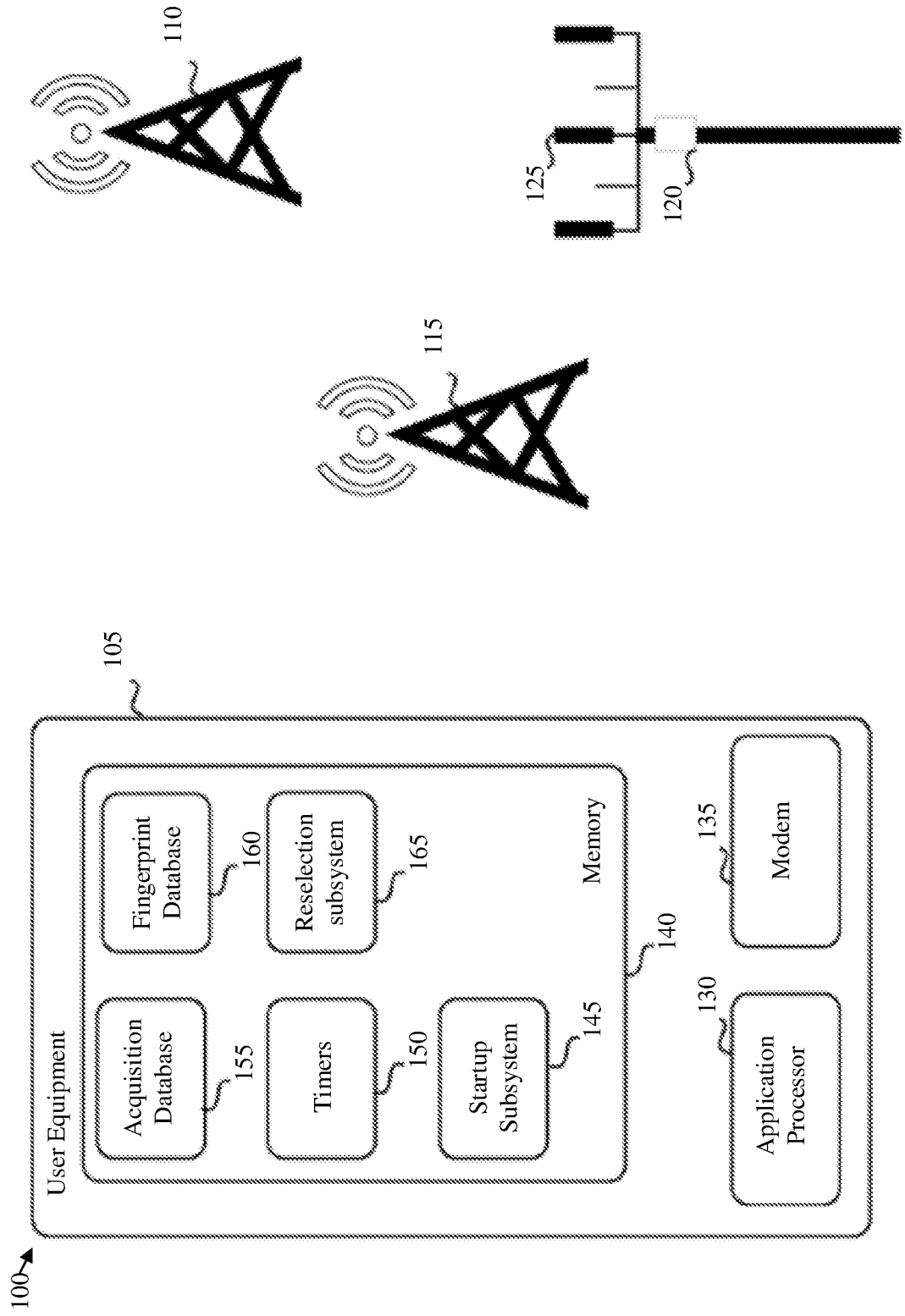
FIG. 1 illustrates an example communication system, according to some embodiments.

FIG. 1 illustrates an example communication system 100. The communication system 100 includes user equipment (UE) 105, long-term evolution (LTE) only cell 110, non-standalone (NSA) cell 115, and 5G cell 120. While described with only a single UE 105, LTE only cell 110, NSA cell 115, and 5G cell 120, communication system 100 may include any number of each component.

LTE only cell 110 may be any cellular communication tower that supports LTE cellular technology but does not have a neighboring 5G cell 120. Without a neighboring 5G cell 120, the LTE only cell 110 cannot allow the network to add the UE 105 to the 5G cell 120 when the UE 105 is camped on the LTE only cell 110 (i.e., the LTE only cell 110 is the serving cell for the UE 105).

NSA cell 115 may be any cellular communication tower that supports LTE cellular technology and has a neighboring 5G cell 120. When UE 105 is camped on the NSA cell 115, the NSA cell 115 can allow the network to add the UE 105 to the 5G cell 120.

5G cell 120 may be any cellular communication tower that supports 5G cellular technology. 5G cell 120 may be smaller than LTE only cell 110 and NSA cell 115. In current communication networks and UEs 105, the UE 105 can utilize the 5G cell 120 by connecting to the NSA cell 115 as the serving cell, which can allow the network to add the UE 105 to the 5G cell 120.

User equipment (UE) 105 may be any suitable mobile device that has wireless communication ability for accessing an LTE network and that supports 5G technology. UE 105 includes memory 140, application processor 130, and modem 135. UE 105 may include additional components left out of FIG. 1 for case of description such as, for example, a display, a user interface, and the like. UE 105 may include, for example, components described in computer system 1000 as described with respect to FIG. 10.

Application processor 130 may be a chip used for the primary application processing in UE 105. For example, the application processor 130 may execute instructions in memory 140, including, for example, the instructions included in startup subsystem 145, and reselection subsystem 165. A different chip may handle, for example, the display of the UE.

Modem 135 may be a chip used to enable communication on the network using LTE or 5G technology (e.g., communication protocols and the like). Modem may allow UE 105 to communicate with LTE only cell 110, NSA cell 115, and/or 5G cell 120. The modem may have some processing capability including the ability to set values in memory 140 and may communicate with the application processor 130 to provide data received from LTE only cell 110, NSA cell 115, and/or 5G cell 120.

Memory 140 includes acquisition database 155, fingerprint database 160, timers 150, reselection subsystem 165, and startup subsystem 145. Memory 140 may include additional components not described herein for simplicity, and the functionality described herein may be incorporated into more or fewer components of memory 140 without departing from the scope of this disclosure.

Acquisition database 155 may be a database including information on each cell that UE 105 has previously camped on (i.e., each cell that has been a serving cell for UE 105). The acquisition database 155 can include an entry for each cell. The acquisition database 155 may include, for example, the public land mobile network (PLMN) identifier for the cell, the cell identifier of the cell, the frequency for the cell, and a flag value indicating whether the cell is an NSA cell or not. The information for the known cells stored in the acquisition database 155 can be used to more quickly identify a suitable serving cell for the UE 105 on startup, and the flag value can be used to give preference to the NSA cell 115. Further, the acquisition database 155 can be used to identify preferable NSA cells 115 during reselection if the UE 105 is camped on LTE only cell 110. An example acquisition database 155 is depicted and described with respect to FIG. 2.

Fingerprint database 160 may be a database including information about known LTE only cells 110 and corresponding neighboring NSA cells 115. UE 105 may or may not have used LTE only cells 110 and/or NSA cells 115 as serving cells for their entry in fingerprint database 160. Rather, when UE 105 receives information about a neighboring LTE only cell 110 to NSA cell 115 that UE 105 is camped on, or when UE 105 receives information about a neighboring NSA cell 115 to LTE only cell 110 that UE 105 is camped on, UE 105 may update the fingerprint database 160 to include such information. Fingerprint database 160 may be used to expedite cell reselection from an LTE only cell 110 to an NSA cell 115. An example fingerprint database 160 is depicted and described with respect to FIG. 3.

Timers 150 may include at least two timers and a counter. The timers and counter are used during the preferred NSA background search 575 as described with respect to FIG. 5. The first timer is a shorter timer of, for example, 5 seconds that is used after determining the UE 105 is camped on LTE only cell 110. After expiration of timer 1, the preferred NSA background search 575 is performed, which includes the counter and timer 2. After the preferred NSA background search 575 completes, the counter is incremented and compared against a threshold value. If the counter is less than the threshold, timer 2 is executed, and the preferred NSA background search 575 is completed again. The timers and counter help ensure that the battery of the UE 105 is not consumed by unnecessary searching, which is a power consuming task. If a suitable NSA cell 115 is not found during the preferred NSA background search 575 after the threshold number of attempts, the application processor 130 or the modem 135 disable the 5G NSA preferred mode functionality. For example, the counter and two timers are reset and a flag may be set indicating the preferred NSA functionality is off. When the preferred NSA functionality is disabled, legacy search and selection behavior resumes, which does not prioritize NSA cell selection.

Figure 4:
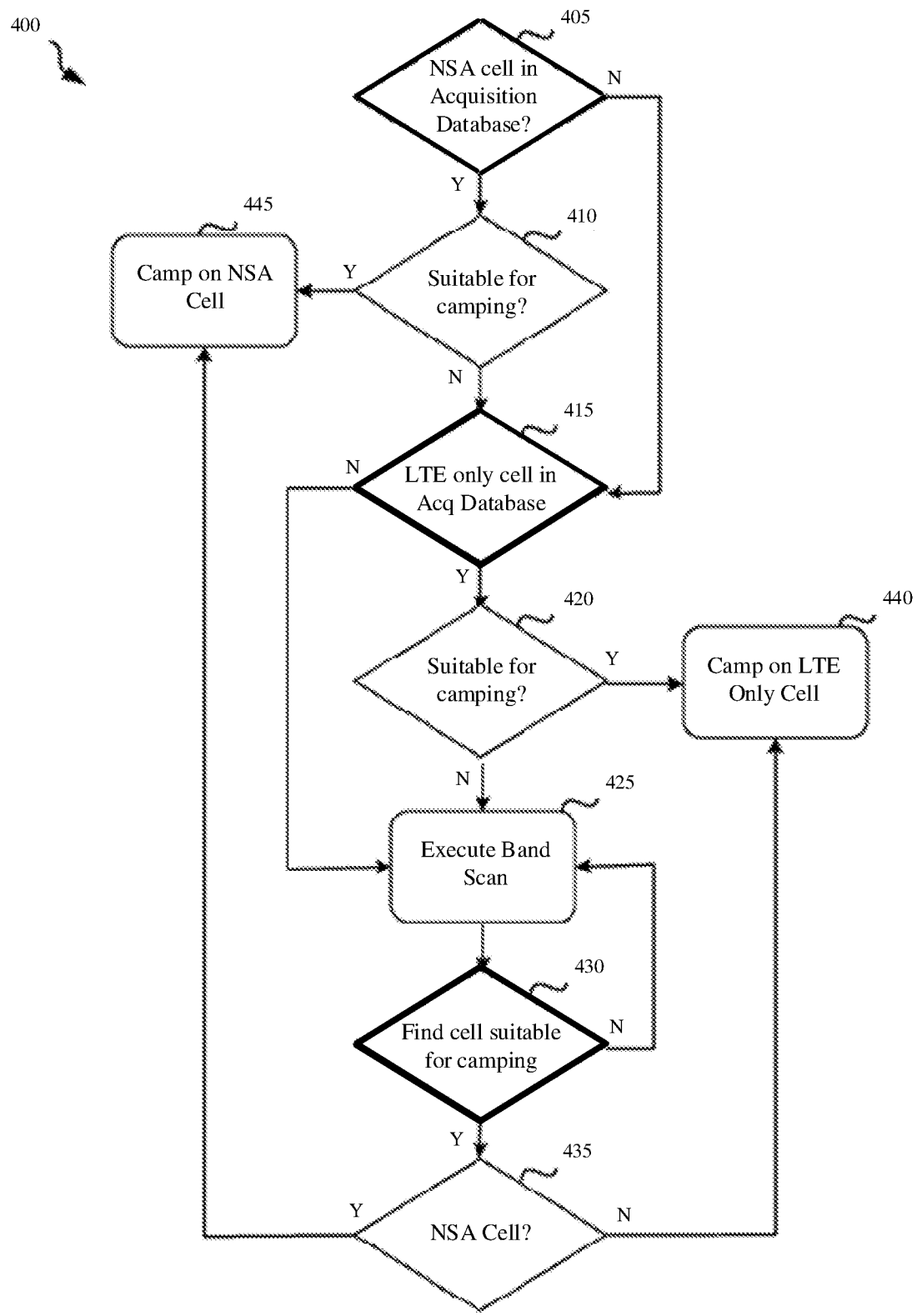
FIG. 4 illustrates an example flowchart for NSA cell preference on UE startup, according to some embodiments.

Startup subsystem 145 may include instructions that are utilized when the UE 105 starts up and begins searching for service. The instructions prioritize finding a NSA cell 115 to camp on based on known information in the acquisition database 155 including the flag indicating whether the cell is an NSA cell 115. If an NSA cell 115 that meets selection criteria is not found in the acquisition database 155, an LTE only cell 110 can be selected from the acquisition database 155 that meets the selection criteria. If no cell within acquisition database 155 is found that meets the selection criteria, a band scan is executed to find a cell that meets the selection criteria. The band scan continues until the UE finds a suitable serving cell. Flowchart 400 described with respect to FIG. 4 illustrates the startup process performed by startup subsystem 145.

Figure 5:
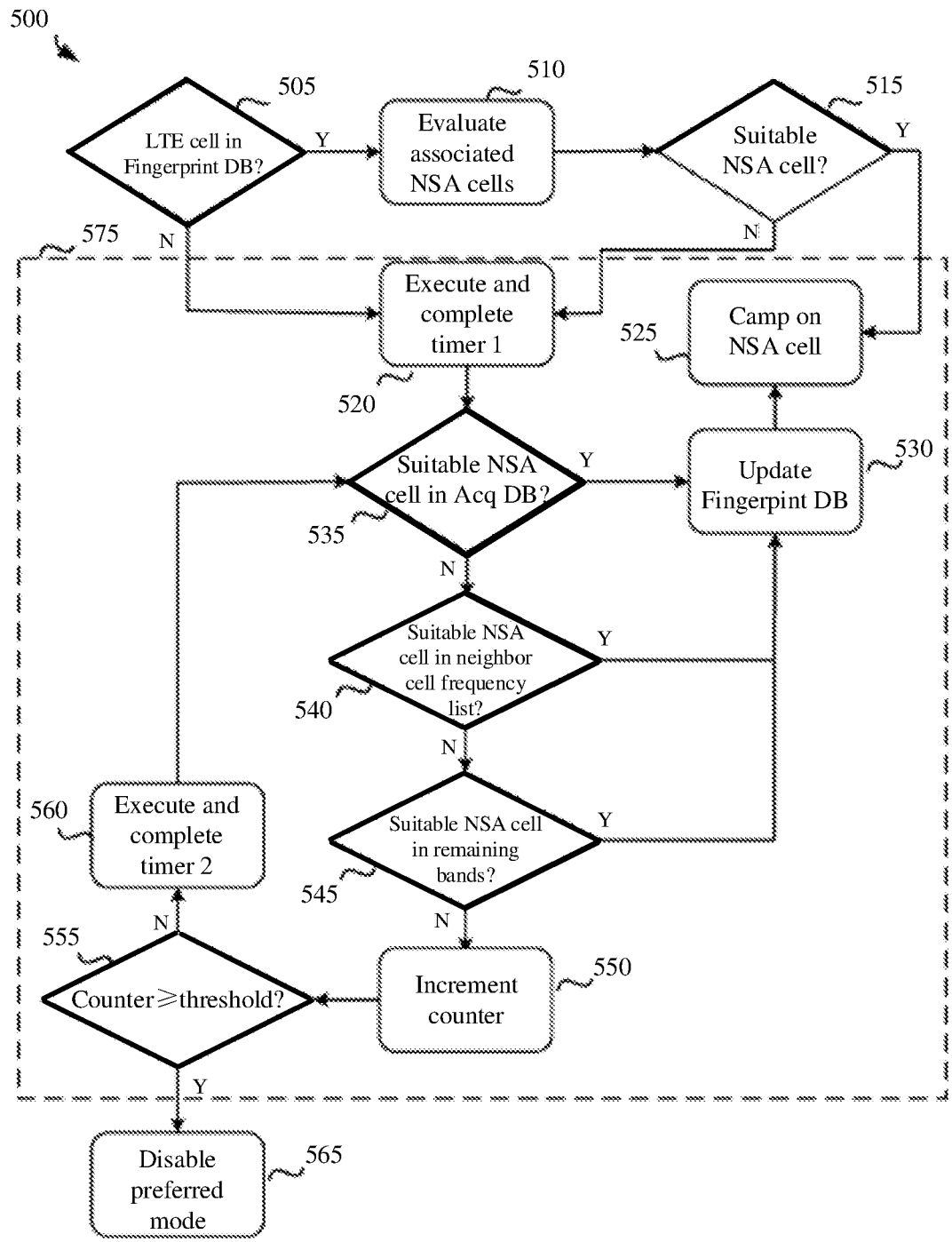
FIG. 5 illustrates an example flowchart for NSA cell preference on cell reselection, according to some embodiments.

Reselection subsystem 165 may include instructions that are utilized when UE 105 is camped on LTE only cell 110 that prioritize reselection of an NSA cell 115. To ensure that UE 105 has service, if NSA cell 115 is not found quickly, UE 105 selects LTE only cell 110 as the serving cell. Once on an LTE only cell 110, UE 105 may expedite preferential searching for NSA cell 115 to reselect and use as the serving cell. The fingerprint database 160 is searched for NSA cell 115, and if fingerprint database 160 does not have an entry for NSA cell 115, UE 105 performs an ordered search to identify a preferred NSA cell 115 to camp on. Flowchart 500 described with respect to FIG. 5 illustrates the reselection process performed by reselection subsystem 165.

FIG. 2 illustrates an example legacy acquisition database 205 without an NSA cell flag 210 and a second example acquisition database 155 with NSA cell flag 210. The data shown in legacy acquisition database 205 and acquisition database 155 is for exemplary purposes and does not limit the scope of the description.

Legacy acquisition database 205 does not include NSA cell flag 210 and has fewer entries than acquisition database 155 as it may be limited to fewer entries than acquisition database 155. Legacy acquisition database 155 may not be used for the described 5G NSA preferred mode described herein. Rather, legacy acquisition database 155 may be used for UEs 105 that do not have 5G capability or otherwise do not implement the 5G NSA preferred mode.

Acquisition database 155 may include the same information as legacy acquisition database 205, but further may include the NSA cell flag 210 value for each entry. Acquisition database 155 may also have more entries than legacy acquisition database 205. Each entry may include, for example, an entry number, a public land mobile network (PLMN) identifier for the cell, a frequency for the cell, a cell identifier for the cell, and an NSA flag 210 value for the cell. In some embodiments, the cell identifier combined with the frequency for the cell creates a unique combination for each cell. In some embodiments, the NSA cell flag 210 is a binary value that is set to TRUE (e.g., 1) or FALSE (e.g., 0). In some embodiments, a different value may be used to indicate the type of cell (e.g., LTE, NSA, 5G, and the like). The acquisition database 155 is used during UE startup or out of service search to quickly prioritize selection of a suitable NSA cell if one is known within the acquisition database 155 and meets the selection criteria for the UE. Flowchart 400 describes the startup prioritization procedure in more detail. Acquisition database 155 is further used during the 5G preferred NSA background search 575 that is described with respect to FIG. 5 in further detail. In the 5G preferred NSA background search 575, used when the UE is camped on an LTE only cell, the acquisition database 155 is used to identify NSA cell frequencies to scan for NSA cells to move to before performing a band scan of all bands. By scanning known NSA frequency bands first, the UE may find a suitable NSA cell first to camp on. After finding an NSA cell to camp on, the UE stops searching and configures settings to help ensure the UE does not move off the NSA cell as discussed with respect to flowchart 600 of FIG. 6.

FIG. 3 illustrates an example fingerprint database 305. Fingerprint database 305 includes entries for LTE only cells and corresponding neighboring NSA cells. As shown in FIG. 3 with example data, LTE only cell having cell identifier C1 and frequency F1 has two neighbor NSA cells. NSA cell having cell identifier C3 and frequency F1 is neighboring LTE only cell having cell identifier C1, and NSA cell having cell identifier C4 and frequency F2 is neighboring LTE only cell having cell identifier C1. The UE can add entries into fingerprint database 160 upon camping on an NSA cell or an LTE only cell to identify the neighboring cells for entry into fingerprint database 160. Fingerprint database 160 is then used as the initial step to identify any known neighboring NSA cells when the UE is camped on an LTE only cell. For example, if the UE is camped on LTE only cell having identifier C2 and frequency F3, using fingerprint database 160, the UE can identify that NSA cell having cell identifier C5 and frequency F4 is neighboring. Accordingly, the UE can scan frequency F4 for NSA cell C5 to determine if C5 is a suitable serving cell for the UE. If so, the UE can reselect and move to C5 from C2. If C5 is not available or suitable for the UE to camp on, the UE can execute the 5G preferred NSA background search 575 as described in further detail with respect to FIG. 5.

FIG. 4 illustrates an example flowchart 400 for preferred selection of an NSA serving cell (e.g., NSA cell 115) on startup of a UE (e.g., UE 105). When the UE initializes on startup or when the UE is removed from a serving cell for any reason, the UE may execute flowchart 400 by startup subsystem 145. At decision block 405 the UE determines whether an NSA cell is in the acquisition database (e.g., acquisition database 155). The UE can check the NSA cell flag 210 in the acquisition database 155 entries to identify an NSA cell to attempt to connect to so that the NSA cell is the serving cell for the UE. In some embodiments, the UE starts with the first entry to determine whether the NSA cell flag is set to true. In the example acquisition database 155 shown in FIG. 2, the first entry for cell identifier 0 has the NSA cell flag 210 set to TRUE. Accordingly, the UE can scan frequency 1215 for Cell 0. If Cell 0 meets the selection criteria, the UE can connect to Cell 0 to be the serving cell for the UE. If Cell 0 does not meet the selection criteria for the UE, the UE can check the second entry. In the example acquisition database 155 in FIG. 2, the second entry has an NSA cell flag 210 value of FALSE, so the UE checks the third entry. This process continues until the UE either identifies an NSA cell that meets the selection criteria for the UE or the UE has not found an entry after checking all of the entries that have the NSA cell flag 210 set to TRUE and the corresponding NSA cell meets the selection criteria for the UE.

At decision block 410, the UE determines whether an NSA cell was found in the acquisition database 155 that is suitable for camping. If so, the UE camps on the NSA cell at step 445. If not, the UE checks the acquisition database at decision block 415 for an LTE only cell. In the example acquisition database 155 of FIG. 2, the UE may start at the beginning of the acquisition table 155 and determine that the first entry has the NSA cell flag 210 value set to TRUE, so the UE then checks the second entry, which in the example has the NSA cell flag 210 value set to FALSE. The UE scans frequency 2256 for cell identifier 3 to see if Cell 3 meets the selection criteria of the UE. If not, the UE checks the next entry in the acquisition database 155. This process continues until the UE either identifies an LTE only cell that meets the selection criteria for the UE or the UE has not found an entry after checking all of the entries that have the NSA cell flag 210 set to FALSE and the corresponding LTE only cell meets the selection criteria for the UE.

At decision block 420, the UE determines whether an LTE only cell was found in the acquisition database 155 that is suitable for camping. If so, the UE camps on the LTE only cell at step 440. If not, the UE executes a band scan. In some embodiments, the UE will not scan frequency bands already scanned from the acquisition database 155 to avoid duplicate unnecessary processing and battery consumption. At decision block 430, the UE determines if the band scan has identified a frequency having a cell that is meets the selection criteria for the UE. In some embodiments, during the band scan, the goal is for the UE to get service, regardless of which type of cell, as quickly as possible because until the UE is connected to a serving cell, the UE is not connected to any mobile communication network. If the band scan completes without finding a suitable cell for a serving cell that meets the selection criteria of the UE, the UE continues to execute the band scan until a suitable cell for camping on is identified. At decision block 435, the UE determines if the cell that is suitable for camping on is an NSA cell or an LTE only cell. If the cell is an NSA cell, the UE camps on the NSA cell at step 445. The UE may then, in some embodiments, continue to execute flowchart 600. If the cell is an LTE only cell, the UE camps on the LTE only cell at step 440. The UE may then, in some embodiments, execute flowchart 500.

Upon completion of flowchart 400, the UE is camped on either an NSA cell or an LTE cell. While NSA cells are initially prioritized, because the UE is not connected to any cell during performance of flowchart 400, the UE does not forego connecting to an LTE only cell that is suitable to continue searching for an NSA cell. Rather, the UE will connect to the LTE only cell and then proceed to expedite preferred reselection of an NSA cell as discussed with respect to flowchart 500 of FIG. 5.

FIG. 5 illustrates an example flowchart 500 for preferred reselection of an NSA serving cell (e.g., NSA cell 115) for a UE (e.g., UE 105) when an LTE only cell (e.g., LTE only cell 110) is the serving cell for the UE. At decision block 505, the UE determines whether the LTE only cell is in the fingerprint database 160. If the LTE cell is in the fingerprint database 160, the UE evaluates any associated neighboring NSA cells listed in the fingerprint database 160. For example, if the UE is camping on Cell C1 at frequency F1, the UE evaluates Cell C3 on frequency F1 and Cell C4 on frequency F2. This evaluation process is described with respect to flowchart 700 of FIG. 7.

Figure 7:
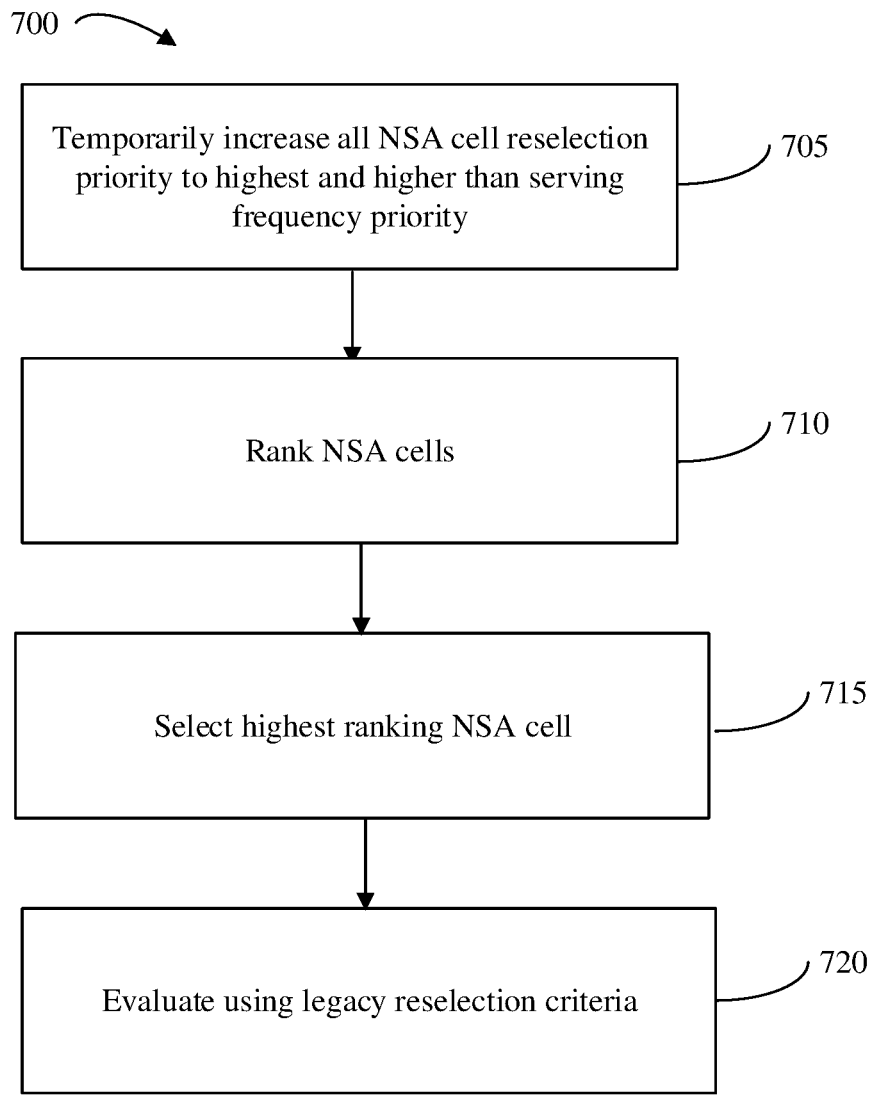
FIG. 7 illustrates an example flowchart for UE behavior in response to camping on an LTE only cell, according to some embodiments.

FIG. 7 illustrates an example flowchart 700 for a UE (e.g., UE 105) to more quickly reselect an NSA cell (e.g., NSA cell 115) if the serving cell for the UE is an LTE only cell (e.g., LTE only cell 110). At step 705, the UE temporarily increases all NSA cell reselection priority to the highest values, which is higher than the serving frequency priority for the serving cell. Using the example of fingerprint database 160 and that the UE is camping on Cell C1 on frequency F1, the UE temporarily increases the NSA cell reselection priorities for Cell C3 on frequency F1 and for Cell C4 on frequency F2 to a higher priority than the priority set for Cell C1 at frequency F1.

At step 710, the UE ranks the NSA cells based on signal quality or signal strength. Continuing with the example above, Cell C3 and Cell C4 are ranked. For the purposes of this example, Cell C3 is ranked higher than Cell C4.

At step 715, the UE selects the highest ranking NSA cell. In this example, the UE selects Cell C3. At step 720, Cell C3 at frequency F1 is evaluated using reselection criteria. In some embodiments, the reselection criteria is the legacy reselection criteria used in systems that do not have the 5G NSA preferred mode. If Cell C3 does not meet the reselection criteria, Cell C4 is evaluated.

Returning to FIG. 5, at decision block 515, the UE determines whether the evaluation at step 510 resulted in finding a suitable NSA cell. If a suitable cell is found at decision block 515, the UE camps on the NSA cell at step 525. If the evaluation did not result in a suitable NSA cell, the UE executes timer 1 at step 520. The UE executes timer 1 at step 520 if, at decision block 505 the LTE only cell the UE is camping on is not in the fingerprint database 160.

Executing timer 1 at step 520 is the first in a series of steps that are the preferred NSA background search 575 shown by the dashed box. Timer 1 may be, for example a 5-second timer that simply creates a delay before further searching is completed by the UE to avoid constant searching resulting in battery drain of the UE. The UE checks at decision block 535 for a suitable NSA cell listed in the acquisition database 155. In some embodiments, the UE starts with the first entry looking for whether the entry has the NSA cell flag value set to TRUE. If so, the UE scans the NSA cell frequency associated with the first entry for the cell identifier to measure whether the NSA cell meets the selection criteria. If not, the UE moves to the next entry in the acquisition database 155 until the UE either runs out of entries in the acquisition database or finds an NSA cell that meets the selection criteria. If the UE finds an NSA cell that meets the selection criteria, the UE updates the fingerprint database 160. In this example, the UE is camping on LTE only cell C1, and neither of Cells C3 or C4 were suitable from the fingerprint database 160. However, the UE can update the fingerprint database 160 with the discovered neighbor NSA cell found as another NSA cell associated with LTE only cell C1. At step 525 the UE can camp on the NSA cell.

If the UE did not find a suitable NSA cell in the acquisition database at decision block 535, the UE can determine if there is a suitable NSA cell in the neighbor cell frequency list at decision block 540. The neighbor cell frequency list is provided by the LTE only cell (e.g., C1) that the UE is camped on, which is configured by the network (e.g., in system information block 5). The UE can scan the frequencies in the neighbor cell frequency list to determine if one of the NSA cells associated with one of the neighbor cell frequencies in the list meets the selection criteria (i.e., reselection criteria) for the UE. If the UE finds a suitable NSA cell in the neighbor cell frequency list, the UE can update the fingerprint database 160 with the new NSA cell information (e.g., associated with LTE only cell C1 in the example) at step 530. At step 525, the UE can camp on the NSA cell.

If the UE did not find a suitable NSA cell in the neighbor cell frequency list, the UE can determine whether there is a suitable NSA cell in the remaining frequency bands at decision block 545. In particular, the UE may first scan frequency bands derived from the acquisition database 155 NSA cells. This scan provides another opportunity of utilizing the acquisition database in relation to the remaining frequency bands before proceeding to the subsequent process. If no suitable NSA cells are found, then the priority band list is scanned for a suitable NSA cell. The priority band list is stored in memory of the modem 135. If no suitable NSA cells are found, then the remaining frequency bands are scanned for an NSA cell. If a suitable NSA cell is found as derived from the acquisition database 155, the priority band list, or the remaining frequency bands, the UE updates the fingerprint database 160 at step 530 and camps on the NSA cell at step 525. If no suitable NSA cell is identified at decision block 545, the UE increments the counter at step 550. The counter is used to ensure that the preferred NSA background search 575 does not continue searching despite no available NSA cells as that would drain the battery of the UE. Accordingly, at decision block 555, the UE determines if the counter is greater than or equal to a threshold. The threshold may be, for example, 5, so that the UE executes the preferred NSA background search 575 five times before the counter reaches the threshold. If the counter is equal to or greater than the threshold, the UE disables the 5G preferred NSA mode at step 565. Disabling the 5G preferred NSA mode may include, for example, resetting the timers (timer 1 and timer 2), resetting the counter, and stopping the preferred NSA background search 575. In some embodiments, disabling the feature may include setting a flag to false to indicate the preferred mode methods should not be performed. Note that the 5G preferred NSA mode may be reenabled when the user location changes such that the user may have to switch cells from the LTE only cell currently camped on, indicating new NSA cells may be available in the new location for selection.

At decision block 555 if the UE determines the counter is less than the threshold, the UE executes the timer 2, which is typically a slightly longer timer than timer 1. For example, if timer 1 is 5 seconds, timer 2 may be 30 seconds. The timer delay helps ensure that sufficient time passes before the preferred NSA background search 575 executes again to avoid excessive power consumption.

Figure 6:
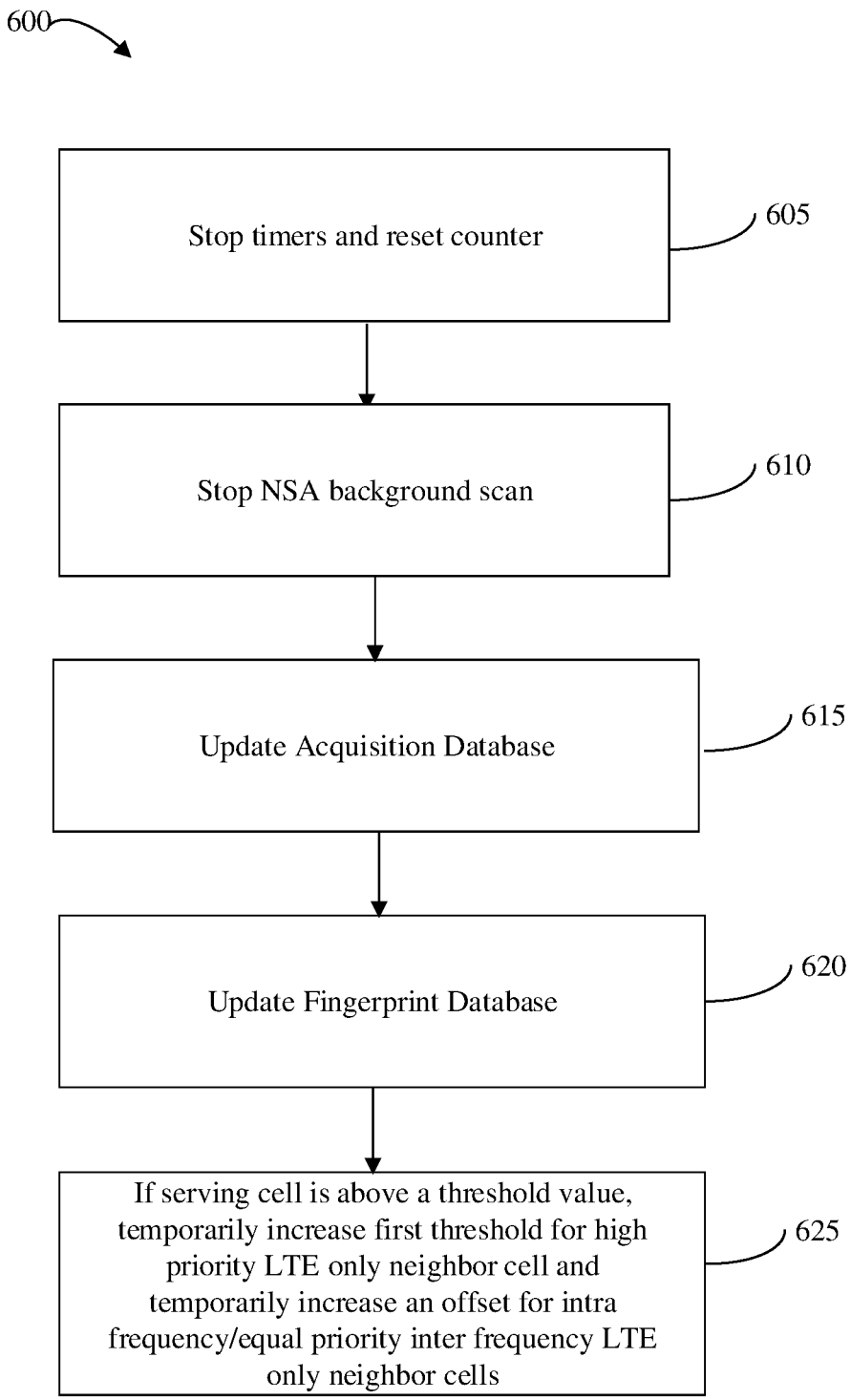
FIG. 6 illustrates an example flowchart for UE behavior in response to camping on an NSA cell, according to some embodiments.

FIG. 6 illustrates an example flowchart 600 for a UE (e.g., UE 105) when an NSA cell (e.g., NSA cell 115) is the serving cell for the UE (i.e., the UE is camped on the NSA cell). When the UE is camped on an NSA cell, the UE may reselect to an LTE only cell because the LTE only cell has a higher priority or better signal. To avoid this unwanted reselection, flowchart 600 may be performed by the UE to encourage the UE to remain on the NSA cell. Flowchart 600 begins with the UE stopping the timers and resetting the timers and counter at step 605. The UE may stop the preferred NSA background search 575 at step 610 to avoid searching for additional NSA cells. This will maintain batter power for the UE. At step 615, the UE may update the acquisition database 155 with the NSA cell information of the serving cell for the UE. At step 620, the UE may update the fingerprint database 160 with discovered NSA cell information and any associated known LTE only cell information. At step 625, the UE may temporarily increase the first threshold for high priority LTE only neighboring cell and temporarily increase an offset for intra frequency/equal priority inter frequency LTE only neighbor cells if the serving NSA cell is above a threshold value. Ensuring the serving NSA cell is above a threshold value helps ensure the UE does not stay camping on an inferior cell. Increasing the first threshold for the high priority LTE only neighbor cell and the offset for the intra frequency/equal priority inter frequency LTE only neighbor cells ensures that it is more difficult for the UE to reconnect to the LTE only neighbor cell. Accordingly, the UE is more likely to remain camped on the NSA cell.

Figure 8:
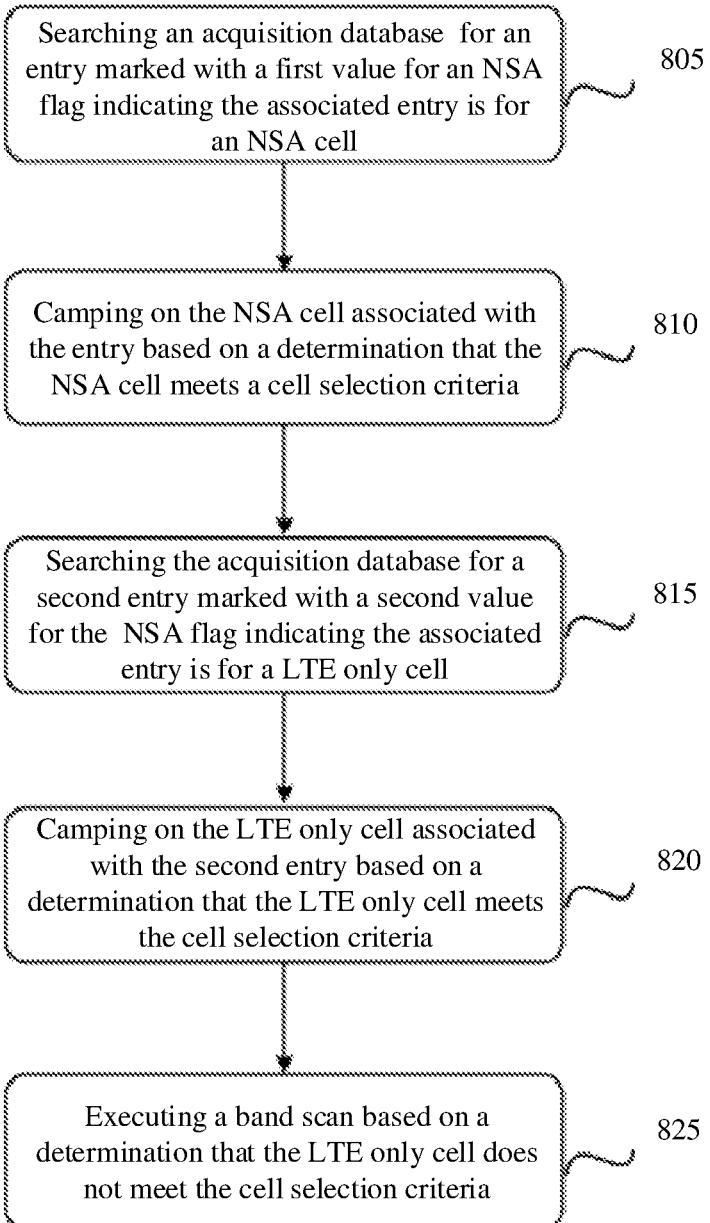
FIG. 8 illustrates an example method for preferably accessing an NSA cell on UE startup, according to some embodiments.

FIG. 8 illustrates a method 800 for a UE (e.g., UE 105) to preferably select an NSA cell (e.g., NSA cell 115) as the serving cell during startup of the UE. The method 800 may be performed by the application processor of the UE based on instructions stored in the memory of the UE. In some embodiments, some portions of the method 800 may be performed by, for example, the modem of the UE.

Method 800 begins at step 805 with the UE (e.g., UE 105) searching an acquisition database (e.g., acquisition database 155) for an entry marked with a first value for an NSA flag (e.g., NSA flag 210) indicating the associated entry is for an NSA cell. For example, the UE identifies a first entry in the acquisition database to determine if the first entry is associated with an NSA cell, if not, the UE checks the second entry in the acquisition database and so forth until the UE finds an NSA cell in the acquisition database or runs out of entries.

At step 810, if the UE determines that the NSA cell meets the cell selection criteria, the UE camps on the NSA cell associated with the entry marked as an NSA cell. If, the UE determines that the NSA cell does not meet the cell selection criteria, or if the UE does not find an entry marked as an NSA cell in the acquisition database, the UE searches the acquisition database for entries marked with the NSA flag indicating the associated cell is an LTE only cell at step 815. The UE may check the first entry and, if the entry does not indicate the entry is for an LTE only cell, the UE may check the next entry and so forth until the UE finds an LTE only cell in the acquisition database or runs out of entries.

At step 820, if the UE determines that the LTE only cell identified in the acquisition database meets the cell selection criteria, the UE camps on the LTE only cell associated with the entry marked as an LTE only cell. If the UE determines that the LTE only cell does not meet the cell selection criteria, or if the UE does not find an entry marked as an LTE only cell in the acquisition database, the UE executes a band scan at step 825. The band scan may be a scan of all frequencies to find any suitable cell for the UE to camp on to provide service to the UE.

Figure 9:
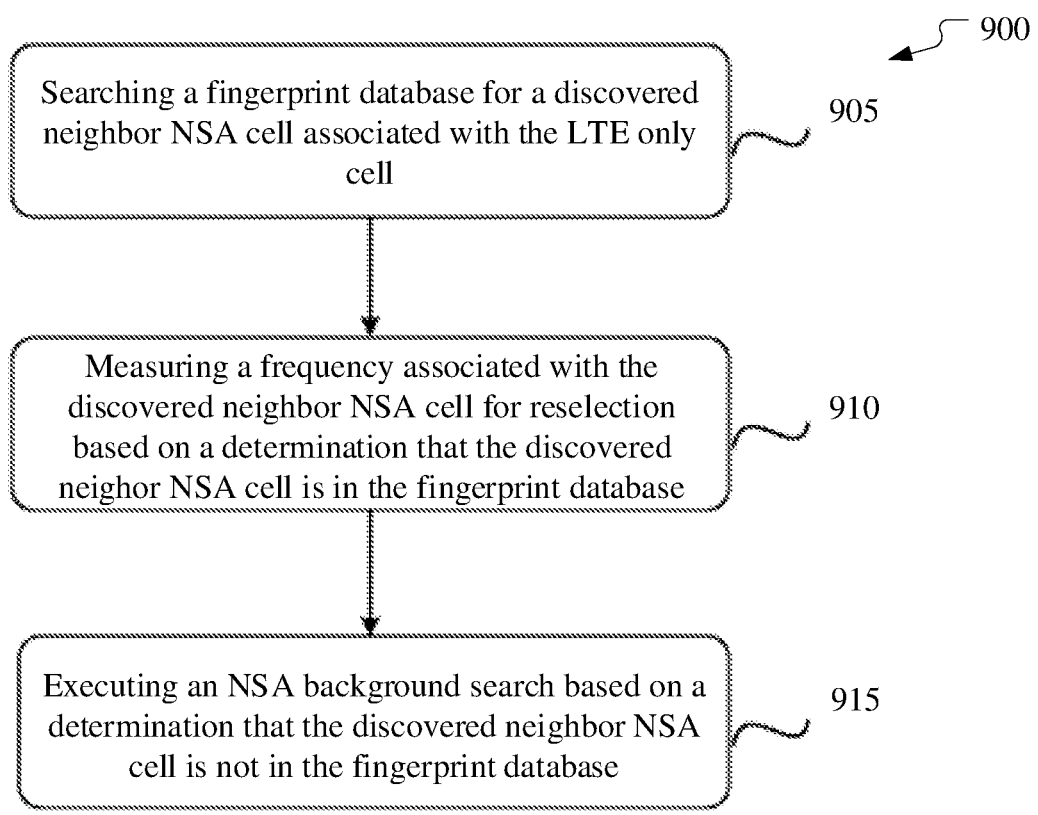
FIG. 9 illustrates an example method for preferably reselecting an NSA cell when the UE is camped on an LTE only cell, according to some embodiments.

FIG. 9 illustrates a method 900 for a UE (e.g., UE 105) to preferably reselect an NSA cell (e.g., NSA cell 115) as the serving cell when the UE is camped on an LTE only cell (e.g., LTE only cell 110). If, in method 800 the UE camped on an LTE only cell, method 900 may be executed to attempt to find an NSA cell to serve the UE. Method 900 begins with the UE searching the fingerprint database (e.g., fingerprint database 160) for a discovered neighbor NSA cell associated with the LTE only cell at step 905. If the UE finds a discovered neighbor NSA cell in the fingerprint database, the UE measures the frequency associated with the discovered neighbor NSA cell for reselection at step 910. If the UE determines that the discovered neighbor NSA cell is not suitable or if there is no discovered neighbor NSA cell in the fingerprint database, the UE executes the NSA background search (e.g., preferred NSA background search 575) to attempt to find an NSA cell to select in place of the LTE only cell the UE is camped on.

Figure 10:
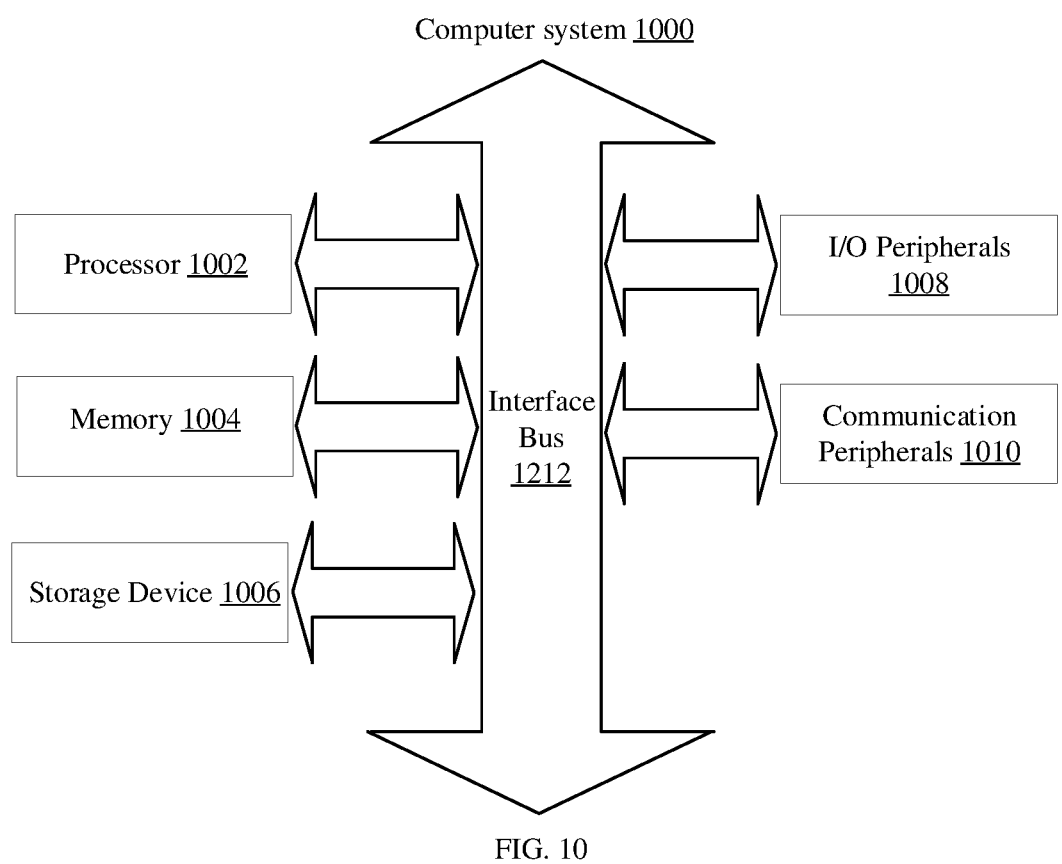
FIG. 10 illustrates an example computer system, according to some embodiments.

FIG. 10 illustrates examples of components of a computer system 1000 according to certain embodiments. The computer system 1000 may be, for example, user equipment 105 as described with respect to FIG. 1. Although these components are illustrated as belonging to a same computer system 1000, the computer system 1000 can also be distributed.

The computer system 1000 includes at least a processor 1002 (e.g., application processor 130), a memory 1004 (e.g., memory 140), a storage device 1006, input/output peripherals (I/O) 1008, communication peripherals 1010, and an interface bus 1012. The interface bus 1012 is configured to communicate, transmit, and transfer data, controls, and commands among the various components of the computer system 1000. The memory 1004 and the storage device 1006 include computer-readable storage media, such as RAM, ROM, electrically erasable programmable read-only memory (EEPROM), hard drives, CD-ROMs, optical storage devices, magnetic storage devices, electronic non-volatile computer storage, for example Flash® memory, and other tangible storage media. Any of such computer readable storage media can be configured to store instructions or program codes embodying aspects of the disclosure. The memory 1004 and the storage device 1006 also include computer readable signal media. A computer readable signal medium includes a propagated data signal with computer readable program code embodied therein. Such a propagated signal takes any of a variety of forms including, but not limited to, electromagnetic, optical, or any combination thereof. A computer readable signal medium includes any computer readable medium that is not a computer readable storage medium and that can communicate, propagate, or transport a program for use in connection with the computer system 1000.

Further, the memory 1004 includes an operating system, programs, and applications. The processor 1002 is configured to execute the stored instructions and includes, for example, a logical processing unit, a microprocessor, a digital signal processor, an application processor, and other processors. The memory 1004 and/or the processor 1002 can be virtualized and can be hosted within another computer system of, for example, a cloud network or a data center. The I/O peripherals 1008 include user interfaces, such as a keyboard, screen (e.g., a touch screen), microphone, speaker, other input/output devices, and computing components, such as graphical processing units, serial ports, parallel ports, universal serial buses, and other input/output peripherals. The I/O peripherals 1008 are connected to the processor 1002 through any of the ports coupled to the interface bus 1012. The communication peripherals 1010 (e.g., modem 135) are configured to facilitate communication between the computer system 1000 and other computing devices over a communications network and include, for example, a network interface controller, modem, wireless and wired interface cards, antenna, and other communication peripherals.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computer system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "including," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A method for a user equipment (UE) to identify a non-standalone (NSA) cell while camping on a long-term evolution (LTE) only cell, the method comprising:
    searching a fingerprint database for a discovered neighbor NSA cell associated with the LTE only cell;
    measuring a frequency associated with the discovered neighbor NSA cell for reselection based upon a determination that the discovered neighbor NSA cell is in the fingerprint database; and
    executing an NSA background search based upon a determination that the discovered neighbor NSA cell that meets reselection criteria is not in the fingerprint database;
    the method further comprises:
        executing a first timer;
    wherein the NSA background search comprises:
        upon expiration of the first timer, searching an acquisition database for an NSA cell that meets reselection criteria;
        measuring a frequency associated with the NSA cell for reselection based upon a determination that the NSA cell is in the acquisition database;
        searching a neighbor NSA cell frequency list for a neighbor NSA cell that meets the reselection criteria based upon a determination that the acquisition database does not contain the NSA cell that meets the reselection criteria;
        measuring a frequency associated with the neighbor NSA cell for reselection based upon a determination that the neighbor NSA cell is in the neighbor NSA cell frequency list; and
        executing a band scan based upon a determination that the neighbor NSA cell frequency list does not contain the neighbor NSA cell that meets the reselection criteria.

2. The method of claim 1, further comprising:
    incrementing a counter based upon a determination that no NSA cell that meet the reselection criteria was identified during the band scan;
    executing a second timer based upon a determination that the counter is less than a threshold value; and
    upon expiration of the second timer, re-executing the NSA background search.

3. The method of claim 1, wherein the band scan comprises:
    searching for a derived NSA cell from the acquisition database;
    measuring a frequency associated with the derived NSA cell for reselection based upon a determination that the derived NSA cell is derived from the acquisition database;
    searching a priority band list for a priority NSA cell based upon a determination that the derived NSA cell that meets the reselection criteria cannot be derived from the acquisition database;
    measuring a frequency associated with the priority NSA cell for reselection based upon a determination that the priority NSA cell is in the priority band list; and
    scanning all remaining frequency bands to find an NSA cell based upon a determination that the priority NSA cell that meets the reselection criteria is not in the priority band list.

4. The method of claim 1, further comprising camping on the NSA cell based upon one of the fingerprint database or the NSA background search.

5. The method of claim 1, further comprising:
    in response to determining the UE is camped on an LTE only cell:
    temporarily increasing all NSA cell reselection priority;
    ranking all NSA cells based upon signal quality or signal strength;
    selecting a highest ranking NSA cell; and
    evaluating the highest ranking NSA cell using the reselection criteria.

6. The method of claim 1, further comprising:
    in response to determining the UE is camped on an NSA cell:
    temporarily increasing a high priority threshold for a high priority LTE only neighbor cell; and
    temporarily increasing an offset for intra frequency/equal priority inter frequency for neighbor LTE only cells.

* * * * *